United States Patent [19]

Ostroot et al.

[11] 3,959,003

[45] May 25, 1976

[54] THIXOTROPIC CEMENTING COMPOSITIONS

[75] Inventors: Gabriel W. Ostroot; Jiten Chatterji, both of Duncan, Okla.

[73] Assignee: Halliburton Company, Duncan, Okla.

[22] Filed: July 20, 1973

[21] Appl. No.: 381,296

Related U.S. Application Data

[62] Division of Ser. No. 242,738, April 10, 1972.

[52] U.S. Cl............................ 106/93; 166/93; 166/89; 252/8.55 R; 106/194
[51] Int. Cl.$^2$.......................... C04B 7/353
[58] Field of Search .......... 166/93, 89; 252/8, 55 R; 106/194, 93; 260/226, 221, 231 R, 231 A, 232

[56] References Cited
UNITED STATES PATENTS

| | | | |
|---|---|---|---|
| 2,842,451 | 7/1958 | Grummitt et al. | 106/194 |
| 2,890,752 | 6/1959 | Crone et al. | 252/8.55 R |
| 3,332,794 | 7/1967 | Hart | 106/194 |

FOREIGN PATENTS OR APPLICATIONS

| | | |
|---|---|---|
| 565,232 | 10/1958 | Canada |
| 555,708 | 4/1958 | Canada |

*Primary Examiner*—Benjamin R. Padgett
*Assistant Examiner*—B. Hunt
*Attorney, Agent, or Firm*—Robert S. Nisbett; John H. Tregoning

[57] ABSTRACT

A thixotropic cementing composition for use in oil and gas wells comprises a hydraulic cement slurry including as an additive a complex reaction product of a water soluble carboxyalkyl, hydroxyalkyl or mixed carboxyalkyl hydroxyalkyl ether of cellulose, and a polyvalent metal salt, for example a reaction product of hydroxyethylcellulose and zirconyl chloride.

25 Claims, No Drawings

THIXOTROPIC CEMENTING COMPOSITIONS

This is a divisional application of application Ser. No. 242,738, filed Apr. 10, 1972.

BACKGROUND OF THE INVENTION

The present invention relates to oil and gas well cements and to a novel additive for imparting thixotropic properties thereto. By a thixotropic cement is meant a cement slurry which will develop a low viscosity in turbulent flow, but which exhibits a high viscosity on setting, the transition being reversible.

The use of a thixotropic cement in connection with well treatments is known in the prior art. A cement of this type is disclosed, for example, in U.S. Pat. No. 2,890,752, in which a nonaqueous cement slurry is formed by admixing with portland cement a liquid hydrocarbon base, such as kerosene or diesel oil, with a sufficient amount of an alkali metal soap to produce a thixotropic gel. However, compositions of this character were designed to control the action of the water present in the well on the cement, rather than the qualities of the cement slurry itself.

Accordingly, a need has existed for a cement slurry which will be pumpable as a thin or low viscosity body, but which when the slurry becomes quiescent attains a relatively high viscosity, but without any setting of the cement. A cement having this quality can be used as a squeeze cement for cementing a casing in an oil or gas well, or for displacing drilling mud from a well, and the like, without danger of premature total setting of the cement content if the pumping operation is interrupted. Resumption of pumping operations breaks the thixotropic gel formed and causes the viscosity to diminish to the lower values which prevailed during the initial thin consistency pumping period.

GENERAL DESCRIPTION OF THE INVENTION

The present invention provides a novel thixotropic cementing composition for oil and gas wells and the like which when formed into a slurry and agitated, as by pumping, will achieve a low viscosity, e.g., 5 to 30 poises, but which will achieve a relatively high viscosity, e.g., 50 to 200 or more poises, but without premature setting of the cement, when the agitation is interrupted and the slurry becomes quiescent. When agitation or pumping is resumed, the viscosity of the slurry rapidly decreases to a value sufficiently low to render the slurry pumpable again. This sequence can be repeated several times or until the cement phase of the slurry hydrates and sets.

The present invention further provides a novel additive which imparts thixotropic properties to a cement slurry. This additive is a complex formed by the reaction of a salt of a polyvalent metal selected from the group consisting of zirconium, lead, chromium, ferric iron, hafnium, lanthanum, and yttrium, with a water soluble cellulose ether capable of forming said complex. The cellulose ether may be of the hydroxyalkyl, carboxyalkyl or carboxyalkylhydroxyalkyl variety.

The preferred polyvalent metal salt is zirconyl chloride (zirconium oxychloride) and the practice of the invention will be illustrated with regard to the use of this compound, but it will be understood that this selection is primarily for purposes of illustration and that the invention is not to be regarded as limited thereto. Other examples of polyvalent metal salts which may be reacted with the cellulose ethers to form the additive of the invention include chromium nitrate, lead chromate, ferric chloride, and lead zirconate.

The water soluble ethers of cellulose which may be employed to form the additive of the invention include hydroxyalkyl cellulose ethers, e.g., hydroxyethyl cellulose; carboxyalkyl cellulose ethers, e.g., carboxymethyl cellulose; and mixed ethers such as carboxyalkyl hydroxyalkyl cellulose, e.g., carboxymethyl hydroxyethyl cellulose. These products, which are usually in the form of their sodium or other alkali metal salts, are free-flowing white powders which must be compatible with the cement and must possess a sufficient degree of polymerization to act as viscosity-building agents for the cement slurry. They must also possess a molecular weight which will impart the desired viscosity to the mix. The average number of hydroxyalkyl and/or carboxyalkyl groups that are substituted per anhydroglucose unit of the cellulose is known as the "degree of substitution" or "D.S." The grades which are useful for the purpose of the present invention generally have a D.S. between about 0.1 and 2.5, preferably between 0.3 and 1.5. For instance, sodium carboxymethyl cellulose ("CMC") having a D.S. from 0.7 to 1.2 is a polyelectrolyte which is ionic in solution and forms clear water solutions over a pH range from 4 to 12 from which it is precipitated only by acidification to pH 1 to 3. Hydroxyethyl cellulose, on the other hand, is nonionic in solution and may be preferred where high tolerance for multivalent cations is desired.

These water soluble hydroxyalkyl cellulose ethers are prepared by known methods, by reacting alkali cellulose with an olefin oxide, such as ethylene oxide, whereby a range of degree of substitution results which depends upon the amount of alkylating agent employed. The degree of substitution influences the solubility properties of the hydroxyalkyl cellulose ether. Suitable hydroxyethyl cellulose ethers are available commercially, for instance, under the designation "Natrosol 250" (Hercules, Inc.) in different grades which exhibit various viscosities in aqueous solution, as measured at concentrations of 2% or 5%. Thus, for example, Natrosol M Grade hydroxyethyl cellulose has a Brookfield viscosity of 4500 to 6500 in 2% solution at 25° C.

An example of water soluble mixed ether is carboxymethyl hydroxyethyl cellulose, also customarily in the form of its sodium salt. A suitable form of this material is commercially available from Hercules, Inc. under the trade name "CMHEC-37M"; its average D.S. is approximately 0.3 carboxymethyl and 0.7 hydroxyethyl, and it has a Brookfield viscosity in the range from 200 to 1000 centipoises in 2% aqueous concentration at 25°C. A different commercial grade of carboxymethyl hydroxyethyl cellulose, which is known under the name "CMHEC-43L", has an average substitution of 0.4 carboxymethyl and 0.3 hydroxyethyl and a Brookfield viscosity in the 20–100 centipoise range in 2% concentration at 25°C.

Each of the foregoing types of water soluble alkyl ethers of cellulose should possess similar degrees of substitution and polymerization. Thus, an appropriate range of molecular weight will lie between about 500,000 and about 3,000,000. A lower molecular weight would not provide sufficient viscosity, while a higher molecular weight would increase the viscosity to an undesirable degree.

The presently preferred additive according to the invention is a complex of zirconyl chloride and hydroxyethylcellulose, and the practice of the invention will be illustrated with regard thereto.

As far as the hydraulic cement is concerned, this may include any portland, aluminous, or pozzolanic hydraulic cement, portland cement being preferred.

A small amount of bentonite, e.g., from about 1% to 3% by weight may also be included as a thickener.

The addition of hydroxyalkyl cellulose ethers to cement slurries for well cementing purposes is disclosed in U.S. Pat. No. 3,483,007, but no polyvalent metal salts are present, and there is no indication that thixotropic properties are imparted to the cement slurry. In U.S. Pat. No. 3,378,070 there is described a tough rubber-like complex of hydroxyethylcellulose and a polyvalent metal ion for forming a viscous tough plug in an underground formation, but no cement is present, and thixotropic properties are not involved.

The water used in the present invention may be any fresh water, preferably water which is not contaminated with calcium or carbonates. Calcium salts, such as calcium chloride, have been found to destroy the stability of some foaming agents which may be optionally included to entrap air in the cement. Carbonates have been found to cause unpredictable flash setting of the cement, which is undesirable.

The water used in the present invention may contain other chloride salts, such as sodium chloride and potassium chloride, in amounts up to about 10% by weight of the water without adversely affecting any of the properties of the light weight cement.

Water should be present in the composition of the present invention in concentrations of from about 23% to about 60% by weight of dry cement. Water concentrations of less than about 23% by weight of cement have been found to result in a cement having unacceptably low strengths. This is thought to be because at a water concentration of about 23% by weight of cement, there is not enough water to wet all the particles of the cement.

Water concentrations higher than about 60% by weight of cement have been found to greatly reduce the strength of the set cement and are thus not normally useful in the present invention.

The preferred water concentration is about 30% by weight of cement. This water concentration has been found to give the highest strengths in the set cement.

The composition of the present invention may also optionally include various auxiliaries or additives, such as so-called densifiers or friction reducing agents or dispersing agents, or a combination of both to improve the properties of the mix, as is otherwise well known in the art. The densifier, which may be a polymer such as, for example, polyvinyl pyrrolidone, serves to promote the retention of water in the mix, while the dispersing agent improves flowability and assists the water in wetting the cement particles. This makes it possible to use smaller proportions of water to form the cement slurry, thereby providing increased cementitious strength after the composition has set. A suitable type of combined densifier-dispersing agent is that disclosed in U.S. Pat. No. 3,359,225, issued Dec. 19, 1967, which is available commercially under the designation CFR-2, and comprises a combination of polyvinyl pyrrolidone and the sodium salt of a naphthalene sulfonate condensed with formaldehyde. Other useful preparations of this type are those sold under the trade names Lomar D, Tamol SM and TIC.

When such a densifier additive is used, it may be present in the composition in concentrations of from about 0.5% to about 2% by weight of cement. Concentrations of less than about 0.5% by weight of cement have been found to have no significant dispersing effect. Concentrations of greater than about 2% by weight of cement have been found to have no increased dispersing effect above that provided by 2%.

The preferred concentration of densifier is about 0.75% by weight of cement. Such a concentration of densifier makes possible a water concentration of about 30% by weight of cement. This water concentration has been found to provide the highest cementitious strengths after the composition has set.

In order to prepare a thixotropic cementing slurry in accordance with the invention, a predetermined amount of water is agitated while there is introduced a dry blend of the cement, the hydroxyalkylcellulose and the polyvalent metal salt. The agitation is continued until the slurry forms a homogeneous mixture. Thus, a slurry containing the additive provided by reacting zirconyl chloride and "Natrosol 250" hydroxyethylcellulose has an initial viscosity of the order of about 17 poises. The slurry is ready to be pumped into the well, and this can be done with little change in viscosity. When the period of pumping is interrupted the viscosity may rise to a level of about 75 to 100 poises within about 20 minutes. When pumping is resumed, the viscosity rapidly decreases to render the slurry pumpable again. The water soluble cellulose derivative has no adverse effect on the cement.

The percentage of hydroxyalkyl or carboxyalkyl cellulose is not critical and may vary from about 0.10% to about 0.75% by weight of the dry cement, the optimum concentration in any given case being dependent upon the type of cement and the grade of cellulose ether derivative used.

The percentage of metal salt employed will depend upon the type of cement, the type of cellulose ether, and upon well conditions, but will ordinarily be in the range of about 0.10% and about 3.0% by weight of the dry cement.

DESCRIPTION OF THE PREFERRED EMBODIMENTS

The following examples will serve to illustrate the practice of the invention, but are not to be regarded as limiting:

EXAMPLE 1

A dry blend is prepared by admixing 100 parts by weight of portland cement (API Class H) with 0.25 parts by weight of "Natrosol 250" hydroxyethyl cellulose and 2.0 parts by weight of zirconyl chloride (zirconium oxychloride). The dry mixture is added to 46 parts of water with vigorous agitation, and the agitation is continued until a homogeneous slurry is obtained. The initial viscosity of this slurry is 17 poises. The slurry is pumped into a simulated well for 10 minutes with substantially no change in viscosity. When the pumping is interrupted, the viscosity rises to 75–100 poises within a period of 20 minutes, but upon resumption of pumping the viscosity rapidly decreases again so that the slurry becomes pumpable once more. This sequence is repeated several times until the cement phase of the slurry hydrates and sets. Total setting time is about 2 hours.

EXAMPLE 2

Proceeding as in Example 1, analogous tests were made using 2 parts by weight of each of chromium nitrate, lead chromate, and ferric chloride. The results were essentially similar.

The scope of the present invention is particularly pointed out in the appended claims.

What is claimed is:

1. A thixotropic slurry for cementing oil and gas wells and the like, comprising portland cement and a complex formed by the reaction of zirconyl chloride with hydroxyethyl cellulose, the slurry being characterized by having a viscosity in the range from about 5 to 30 poises when agitated and in the range from 50 to 200 poises when quiescent.

2. The composition of claim 1 which further includes a densifier and dispersing agent.

3. A dry mixture of a hydraulic cement with from about 0.1% to about 0.75% of hydroxyethyl cellulose and from about 0.1% to about 3.0% of zirconyl chloride, the percentages being by weight of the cement.

4. A thixotropic cement slurry having a relatively high viscosity under quiescent conditions and low viscosity under turbulent conditions, comprising a mixture of water, hydraulic cement and a thixotropic agent formed by complexing a polyvalent metal salt selected from the group consisting of zirconium, lead, chromium, ferric iron, hafnium, lanthanum and yttrium and a water soluble cellulose ether selected from the group consisting of hydroxyethyl cellulose, carboxymethyl cellulose, carboxyethyl cellulose, hydroxyethyl carboxymethyl cellulose or combinations thereof.

5. A thixotropic cement slurry of claim 4 having a relatively high viscosity under quiescent conditions and low viscosity under turbulent conditions, comprising a mixture of water, hydraulic cement and a thixotropic agent formed by complexing in the presence of cement, a polyvalent metal salt and a water soluble cellulose ether.

6. A thixotropic cement slurry of claim 5 wherein the polyvalent metal salt is a salt of zirconium.

7. A thixotropic cement slurry of claim 5 wherein the polyvalent metal salt is a salt of lead.

8. A thixotropic cement slurry of claim 5 wherein the polyvalent metal salt is a salt of chromium.

9. A thixotropic cement slurry of claim 5 wherein the polyvalent metal salt is a salt of ferric iron.

10. A thixotropic cement slurry of claim 5 wherein the polyvalent metal salt is a salt of hafnium.

11. A thixotropic cement slurry of claim 5 wherein the polyvalent metal salt is a salt of lanthanum.

12. A thixotropic cement slurry of claim 5 wherein the polyvalent metal salt is a salt of yttrium.

13. A thixotropic cement slurry of claim 6 in which the soluble cellulose ether is carboxymethyl cellulose, carboxyethyl cellulose or combinations thereof.

14. A thixotropic cement slurry of claim 7 in which the soluble cellulose ether is carboxymethyl cellulose, carboxyethyl cellulose or combinations thereof.

15. A thixotropic cement slurry of claim 8 in which the soluble cellulose ether is carboxymethyl cellulose, carboxyethyl cellulose or combinations thereof.

16. A thixotropic cement slurry of claim 9 wherein the soluble cellulose ether is carboxymethyl cellulose, carboxyethyl cellulose or combinations thereof.

17. A thixotropic cement slurry of claim 10 wherein the soluble cellulose ether is carboxymethyl cellulose, carboxyethyl cellulose or combinations thereof.

18. A thixotropic cement slurry of claim 11 wherein the soluble cellulose ether is carboxymethyl cellulose, carboxyethyl cellulose or combinations thereof.

19. A thixotropic cement slurry of claim 12 wherein the soluble cellulose ether is carboxymethyl cellulose, carboxyethyl cellulose or combinations.

20. An additive which provides thixotropic properties of relatively high viscosity under quiescent conditions and low viscosity under turbulent conditions comprising a complex of a polyvalent metal selected from zirconium, lead, chromium, ferric iron, hafnium, lanthanum and yttrium complexed under alkaline cement conditions with a water soluble cellulose ether selected from hydroxyalkyl cellulose, carboxyalkyl cellulose ethers, mixed ethers and combinations thereof.

21. An additive of claim 20 wherein the polyvalent metal is zirconium and the water soluble ether comprises hydroxyethyl cellulose ether.

22. An additive of claim 20 wherein the polyvalent metal is zirconium and the water soluble ether comprises carboxymethyl cellulose, carboxyethyl cellulose or mixtures thereof.

23. An additive of claim 20 wherein the polyvalent metal is zirconium, lead, chromium, ferric iron, hafnium, lanthanum or yttrium and the water soluble ether is hydroxyethyl cellulose, carboxymethyl cellulose, carboxyethyl cellulose, hydroxyethyl carboxymethyl cellulose or combinations thereof.

24. A thixotropic cement slurry having a relatively high viscosity under quiescent conditions and low viscosity under turbulent conditions, comprising a mixture of water, hydraulic cement and a thixotropic agent formed by complexing a polyvalent metal salt selected from the group consisting of zirconium, lead, chromium, ferric iron, hafnium, lanthanum and yttrium and a water soluble hydroxyethyl cellulose.

25. A thixotropic cement slurry having a relatively high viscosity under quiescent conditions and low viscosity under turbulent conditions comprising a mixture of water, hydraulic cement and a thixotropic agent formed by complexing zirconyl chloride and a water soluble cellulose ether selected from the group consisting of hydroxyethyl cellulose, carboxymethyl cellulose, carboxyethyl cellulose, hydroxyethyl carboxymethyl cellulose or combinations thereof.

* * * * *